United States Patent
Lee et al.

(10) Patent No.: US 10,087,809 B2
(45) Date of Patent: Oct. 2, 2018

(54) SYSTEM AND METHOD FOR PREVENTING FAILURE OF EXHAUST HEAT RECOVERY DEVICE

(71) Applicant: Hyundai Motor Company, Seoul (KR)

(72) Inventors: Myung Jun Lee, Gyeonggi-do (KR); Jun Yong Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 89 days.

(21) Appl. No.: 15/275,746

(22) Filed: Sep. 26, 2016

(65) Prior Publication Data
US 2017/0268400 A1    Sep. 21, 2017

(30) Foreign Application Priority Data
Mar. 15, 2016  (KR) .................. 10-2016-0030733

(51) Int. Cl.
| F01N 3/00 | (2006.01) |
| F01N 3/02 | (2006.01) |
| F01N 5/02 | (2006.01) |
| F01N 3/023 | (2006.01) |
| F02D 41/06 | (2006.01) |

(Continued)

(52) U.S. Cl.
CPC ............... F01N 5/02 (2013.01); F01N 3/023 (2013.01); F01N 3/0234 (2013.01); F01P 3/20 (2013.01); F02D 41/068 (2013.01); F02G 5/02 (2013.01); F02M 26/28 (2016.02); F02M 26/33 (2016.02); F01N 2240/02 (2013.01); F01N 2410/02 (2013.01); F02D 41/0055 (2013.01); F02D 2009/0223 (2013.01);
(Continued)

(58) Field of Classification Search
CPC ........ F01N 2410/02; F01N 3/02; F01N 3/023; F01N 3/0205; F01N 3/0234; F01N 3/2053; F01N 3/2889; F01N 5/02; F01N 2250/10; Y02T 10/166
USPC ........................... 60/295, 297, 298, 311, 320
See application file for complete search history.

(56) References Cited

U.S. PATENT DOCUMENTS

| 2004/0112046 A1* | 6/2004 | Tumati .................. F01N 3/0256 60/297 |
| 2006/0021332 A1* | 2/2006 | Gaiser .................. F01N 3/0256 60/286 |

(Continued)

FOREIGN PATENT DOCUMENTS

| JP | 2004-257323 A | 9/2004 |
| JP | 2009-138615 A | 6/2009 |

(Continued)

*Primary Examiner* — Phutthiwat Wongwian
*Assistant Examiner* — Diem Tran
(74) *Attorney, Agent, or Firm* — Mintz Levin Cohn Ferris Glovsky and Popeo, P.C.; Peter F. Corless

(57) ABSTRACT

A system and method for preventing a failure of an exhaust heat recovery device are provided. The method includes operating a sole exhaust heat recovery mode when cooling water has a temperature less than a warm-up reference temperature to introduce all exhaust gas flowing from a DPF into the exhaust heat recovery device where the exhaust gas exchanges heat with the cooling water. Additionally, a passage through which the exhaust gas bypasses the exhaust heat recovery device is opened when the exhaust gas at a rear of the DPF has a temperature greater than the warm-up reference temperature during the sole exhaust heat recovery mode.

10 Claims, 3 Drawing Sheets

(51) Int. Cl.
*F01P 3/20* (2006.01)
*F02G 5/02* (2006.01)
*F02M 26/28* (2016.01)
*F02M 26/33* (2016.01)
*F02D 41/00* (2006.01)
*F02D 9/02* (2006.01)

(52) U.S. Cl.
CPC ............... *F02D 2200/0812* (2013.01); *F02D 2200/602* (2013.01); *Y02T 10/16* (2013.01); *Y02T 10/166* (2013.01)

(56) References Cited

U.S. PATENT DOCUMENTS

2009/0113876 A1* 5/2009 Grunditz .................. F01N 3/02
   60/278
2013/0220116 A1* 8/2013 Quix .................. B01D 46/0057
   95/14
2014/0352279 A1* 12/2014 Gonze .................... F01N 3/021
   60/274
2014/0352303 A1   12/2014 Santoso et al.

FOREIGN PATENT DOCUMENTS

| JP | 2013-076372 A | 4/2013 |
|---|---|---|
| KR | 10-1998-0028049 A | 7/1998 |
| KR | 2012-0064342 A | 6/2012 |

* cited by examiner

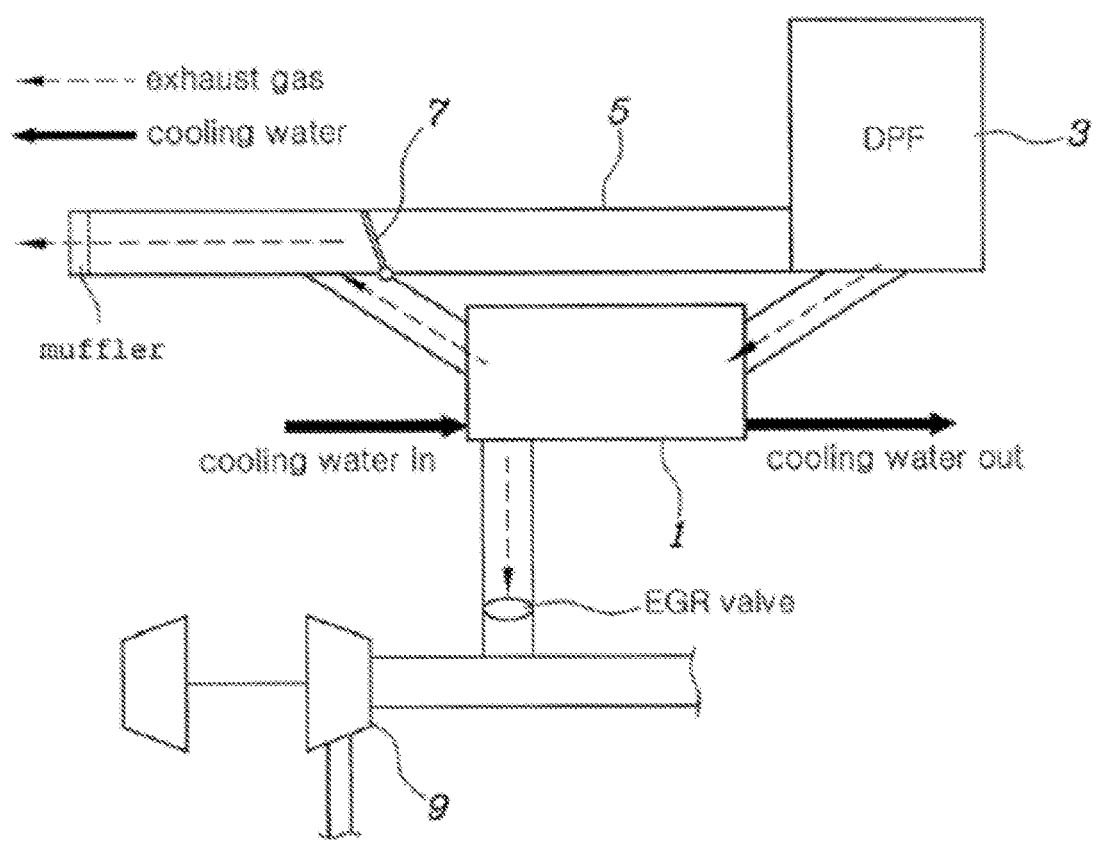

SYSTEM AND METHOD FOR PREVENTING FAILURE OF EXHAUST HEAT RECOVERY DEVICE

CROSS REFERENCE TO RELATED APPLICATION

The present application claims priority to Korean Patent Application No. 10-2016-0030733, filed Mar. 15, 2016, the entire contents of which is incorporated herein for all purposes by this reference.

BACKGROUND

Field of the Invention

The present invention relates to a system and method for preventing failure of an exhaust heat recovery device by controlling the operation of the exhaust heat recovery device based on the driving condition of a vehicle.

Description of the Related Art

With the increasing stringency of carbon dioxide ($CO_2$) emission standards, in addition to consumer demand for high-efficiency vehicles, there remains the requirement for new techniques for improving fuel efficiency. Upon the initial startup of a vehicle, an engine is prone to heat loss and frictional loss due to the low temperature, resulting in poor fuel efficiency. Fast engine warm-up upon initial startup improves fuel efficiency. Hence, thermal management techniques have been extensively applied. Of the thermal management systems applied to vehicles, an exhaust heat recovery device that also operates as a low pressure-exhaust gas recirculation (LP-EGR) cooler installed downstream of the catalyst increases the temperature of engine cooling water and oil upon initial startup through fast warm-up.

Cooling water flows through the exhaust heat recovery device and enters the engine. Accordingly, failure of the exhaust heat recovery device leads to breakdown of the engine. Further, since the EGR gas that passes through the exhaust heat recovery device is directed toward an air intake system, failure of the exhaust heat recovery device may cause the introduction of water or other materials into the cylinder, resulting in the breakdown of the engine. Therefore, there is a need for logic for protecting the exhaust heat recovery device.

The description provided above as a related aft of the present invention is merely for helping in the understanding of the background of the present invention and should not be construed as being included in the related art known by those skilled in the art.

SUMMARY

Accordingly, the present invention provides a method for preventing failure of an exhaust heat recovery device by controlling the operation of the exhaust heat recovery device based on the driving condition of a vehicle.

In order to achieve the above object, according to one aspect of the present invention, a method for preventing a failure of an exhaust heat recovery device may include: in response to determining, by a controller, that cooling water has a temperature that is less than a warm-up reference temperature, operating a sole exhaust heat recovery mode to introduce exhaust gas outflowing from a diesel particulate filter (DPF) into the exhaust heat recovery device where the exhaust gas exchanges heat with the cooling water (e.g., referred to as exhaust heat recovery); and in response to determining, by the controller, that the exhaust gas at a rear of the DPF has a temperature that is greater than the warm-up reference temperature during the sole exhaust heat recovery mode, opening a passage through which the exhaust gas bypasses the exhaust heat recovery device (e.g., referred to as deactivation).

In another exemplary embodiment, wherein when cooling water has a temperature greater than the warm-up reference temperature, prior to the exhaust heat recovery, a normal mode may be activated in which the exhaust gas flow from the DPF is driven toward both the exhaust heat recovery device and the passage for bypassing the exhaust heat recovery device. In addition, the method may further include when the temperature of the exhaust gas at the rear of the DPF is less than a breakdown reference temperature during the sole exhaust heat recovery mode, determining regeneration of the DPF based on a back pressure of the DPF; and when the DPF is determined to undergo regeneration and the opening degree of an accelerator position sensor (APS) is greater than an open reference value, deactivating the sole exhaust heat recovery mode.

In another exemplary embodiment, after the regeneration determination, either when the condition of the DPF does not meet a regeneration reference value or when the opening degree of APS is less than the open reference value, a temperature of cooling water may be compared to an engine warm-up reference temperature. Additionally, the deactivation may be executed by activating a normal mode, in which the exhaust gas released from the DPF 3 is driven toward both the exhaust heat recovery device and the passage for bypassing the exhaust heat recovery device.

Further, the sole exhaust heat recovery mode may be executed to operate the exhaust flap to open a passage along which the exhaust gas may travel from the DPF to a muffler via the exhaust heat recovery device and to close a passage along which the exhaust gas may travel from the DPF to the muffler while circumventing the exhaust heat recovery device; and the normal mode may be executed to operate the exhaust flap to block a passage along which the exhaust gas may travel from the DPF to the muffler via the exhaust heat recovery device and to open a passage along which the exhaust gas may travel from the DPF 3 to the muffler while circumventing the exhaust heat recovery device.

According to the present disclosure, either when the temperature of exhaust gas at the rear of DPF increases to a degree that may cause breakdown of the exhaust hear recovery device or when the back pressure of the DPF increases to a degree that may cause the breakdown of the engine during a sole exhaust het recovery mode, the hot exhaust gas may be controlled such that a portion thereof bypasses, rather than passing entirely through, the exhaust heat recovery device 1, thereby preventing the breakdown of the exhaust heat recovery device and the failure of the engine.

BRIEF DESCRIPTION OF THE DRAWINGS

The above and other objects, features and other advantages of the present invention will be more clearly understood from the following detailed description when taken in conjunction with the accompanying drawings, in which:

FIGS. 2A and 2B are schematic views illustrating the structure of an exhaust heat recovery system according to an exemplary embodiment of the present disclosure, and a change in the flow of the exhaust gas after and before warm-up.

DETAILED DESCRIPTION

Figure 1:
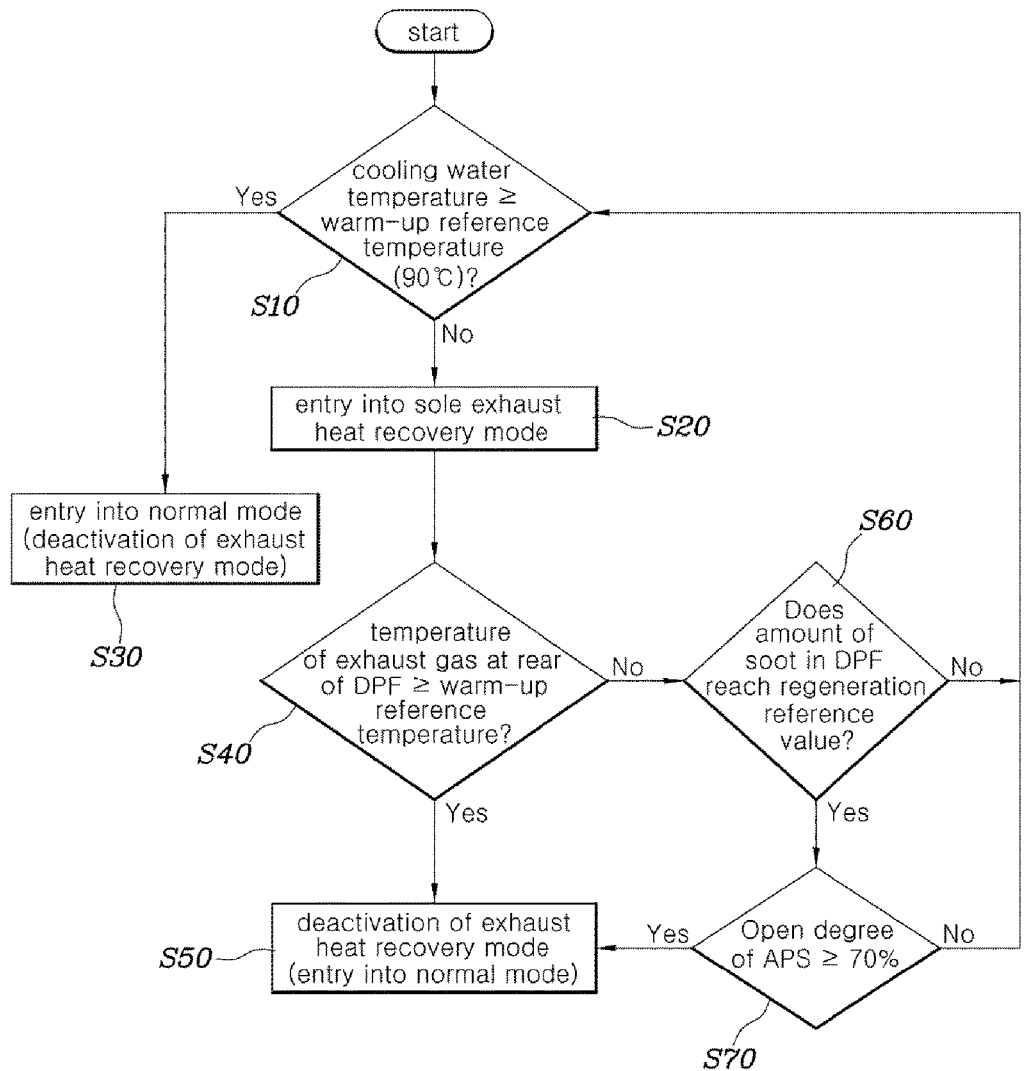
FIG. 1 is a view illustrating a process control flow of a method for preventing failure of an exhaust heat recovery device according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure are described with reference to the drawings. The present disclosure addresses a method for preventing failure of an exhaust heat recovery device, including essentially of an exhaust heat recovery process and a deactivating process.

Figure 3:
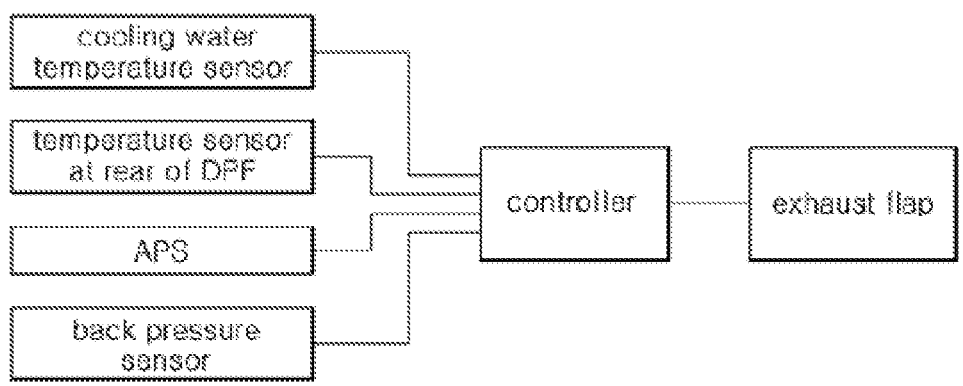
FIG. 3 is a view illustrating a control system of an exhaust heat recovery device according to an exemplary embodiment of the present disclosure.

With reference to FIGS. 1 and 3, when cooling water has a temperature that is less than a warm-up reference temperature, a controller may be configured to initialize a sole exhaust heat recovery mode to introduce the exhaust gas flowing from a DPF 3 into an exhaust heat recovery device 1, where the exhaust gas exchanges heat with the cooling water. In this regard, the temperature of the cooling water may be input through a cooling water sensor installed on a cooling circuit.

Further, the exhaust heat recovery device 1 may operate as a heat exchanger (to recover exhaust heat) and also as an LP-EGR cooler for the LP-EGR system. Hereinafter, it is referred to simply as an exhaust heat recovery device for the sake of convenience. Upon LP-EGR, the EGR gas may pass through the exhaust heat recovery device 1 and then may be introduced into the front of a compressor 9 of a turbocharger. Under these circumstances, cooling water may pass through the exhaust heat recovery device 1, exchanging heat with the EGR gas, whereby the time taken for an engine to warm up may be reduced.

When the exhaust gas at the rear of the DPF 3 has a temperature that is greater than the warm-up reference temperature during the sole exhaust heat recovery mode, the controller may be configured to open a passage 5 through which the exhaust gas bypasses the exhaust heat recovery device 1. In a particular exemplary embodiment, the temperature measured by a temperature sensor installed at the rear of the DPF may be compared to a breakdown reference temperature. The breakdown reference temperature is a safety temperature that protects the exhaust heat recovery device 1 from hot exhaust gas, based on the material of the exhaust heat recovery device 1. Particularly, the breakdown reference temperature may be a temperature for protecting the exhaust heat recovery device 1 from the temperature of the exhaust gas released upon the regeneration or uncontrolled burning of DPF.

When the cooling water is determined to be cold (e.g., less than a particular temperature), as shown in FIG. 2A, the exhaust gas passing through DPF may be directed toward the exhaust heat recovery device 1 to rapidly increase the temperature of the cooling water passing through the exhaust heat recovery device 1, thereby reducing engine warm-up time. However, when the exhaust gas at the rear of DPF is heated to a temperature causative of the breakdown of the exhaust heat recovery device 1 (e.g., breakdown reference temperature) while the sole exhaust heat recovery mode is active, the hot exhaust gas may be allowed to bypass the exhaust heat recovery device 1, and thus, the exhaust heat recovery device may be prevented from being damaged by hot exhaust gas.

Figure 2B:
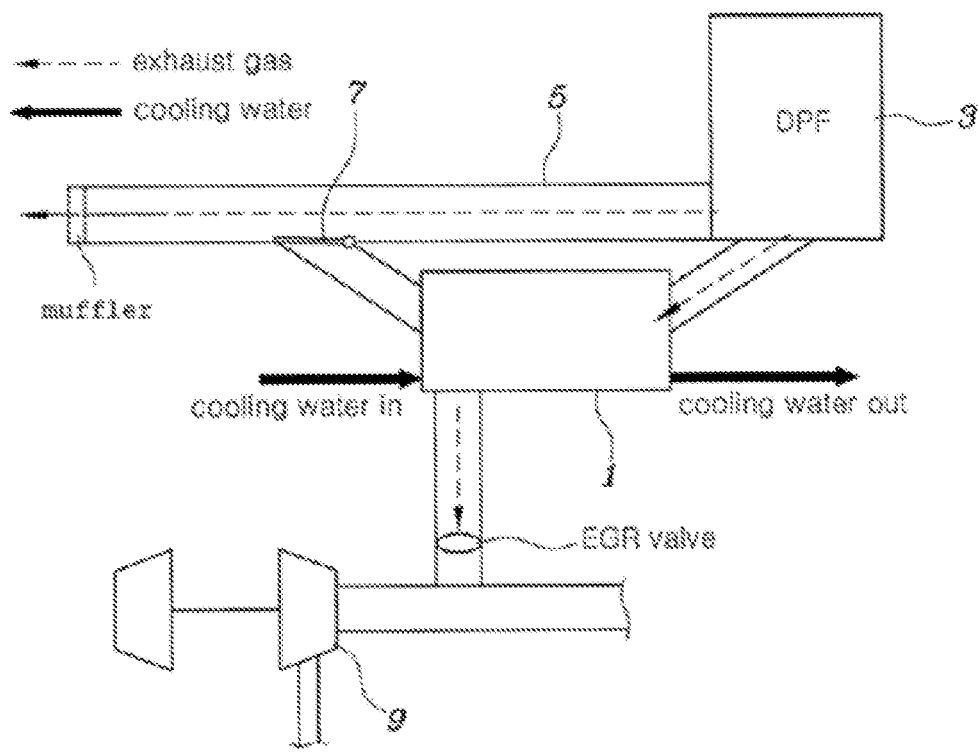

For example, the passage 5 for bypassing the exhaust heat recovery device 1 may be opened to deactivate the sole exhaust recovery mode, and thus, a normal mode may be operated, in which the exhaust gas released from the DPF 3 may be driven toward both the exhaust heat recovery device 1 and the passage 5 for bypassing the exhaust heat recovery device 1. In the normal mode, the exhaust heat recovery device 1 may be used as an LP-EGR cooler, as will be described later. In addition, when cooling water has a temperature that is greater than the engine warm-up reference temperature, the controller may be configured to activate a normal mode, in which the exhaust gas released from the DPF 3 may be driven toward both the exhaust heat recovery device 1 and the passage 5 for bypassing the exhaust heat recovery device 1, prior to the exhaust heat recovery process. In other words, when the cooling water is determined to be warm (e.g., greater than a particular temperature), as shown in FIG. 2B, the exhaust heat recovery device may be used as an LP-EGR cooler. In particular, part of the exhaust gas (e.g., EGR gas) passing through the exhaust heat recovery device 1 may be directed toward the front of the compressor 9 and introduced into an intake system, while the remainder of the EGR gas may escape through a muffler operating as a bypass.

In some exemplary embodiments, as shown in FIGS. 1 and 3, the method of the present invention may further include determining, by the controller, whether the DPF 3 is to perform regeneration based on the back pressure of the DPF 3, when the temperature of the exhaust gas at the rear of the DPF 3 is less than the breakdown reference temperature during the sole exhaust heat recovery mode; and when the DPF 3 is determined to undergo regeneration and the opening degree of the APS is greater than a reference value, deactivating, by the controller, the sole exhaust heat recovery mode. Herein, the back pressure of the DPF 3 may be measured using a back pressure sensor. Based on the fact that the back pressure of DPF increases with the amount of soot in DPF, whether the DPF 3 is to perform regeneration may be determined.

To detect the driver's intention to accelerate the vehicle, the open opening of the APS may be determined. In other words, the amount of pressure exerted onto an accelerator pedal may be determined to detect an intention of a driver to increase the speed of the vehicle. At an excessive opening degree of the APS, the back pressure of the engine may increase excessively, and thus the engine may operate abnormally. Hence, when the back pressure of the engine is increased with the accumulation of soot in the DPF, the operation of the engine at high or full torque may cause an abnormality even during the sole exhaust heat recovery mode. Accordingly, when the driver's driving intention is detected, the breakdown of the engine may be prevented by deactivating the sole exhaust heat recovery mode when the engine is cold.

After the regeneration determination, however, either when the condition of the DPF 3 does not meet a regeneration reference value or when the opening degree of APS is less than a reference value, the temperature of the cooling water may be compared, by the controller, to an engine warm-up reference temperature. In other words, either when the condition of the DPF 3 does not meet a regeneration reference value or when the opening degree of APS is less a reference value for deactivating exhaust heat recovery while the sole exhaust heat recovery mode is operated to recover exhaust heat, the temperature of the cooling water may be measured (e.g., using a sensor) to determine whether the exhaust heat recovery mode will continue or will be deactivated.

In the sole exhaust heat recovery mode, according to another exemplary embodiment of the present disclosure, the controller may be configured to operate the exhaust flap 7 to open a passage along which the exhaust gas may travel from the DPF 3 to the muffler via the exhaust heat recovery device 1 and to close a passage along which the exhaust gas may travel from the DPF 3 to the muffler while circumventing the exhaust heat recovery device 1. For example, referring to FIG. 2A, the exhaust flap 7 may be operated to block the passage through which exhaust gas may directly move from the DPF to the muffler. Under this condition, all of the exhaust gas released from the DPF may be introduced into the exhaust heat recovery device 1 to rapidly increase the temperature of the cooling water, with the consequent reduction of the engine warm-up time.

In the normal mode, according to another exemplary embodiment of the present disclosure, the controller may be configured to operate the exhaust flap 7 to block a passage along which the exhaust gas may travel from the DPF 3 to the muffler via the exhaust heat recovery device 1 and to open a passage along which the exhaust gas may travel from the DPF 3 to the muffler while circumventing the exhaust heat recovery device 1. For example, with reference to FIG. 2B, the exhaust flap 7 may be operated, after engine warm-up, to block a passage through which exhaust gas may move from the exhaust heat recovery device 1 to the muffler. Under this condition, some of (e.g., a portion of) the exhaust gas released from the DPF may be introduced into the front of the compressor 9 through the exhaust heat recovery device 1 (e.g., EGR cooler) while the remainder (e.g., the remaining exhaust gas) may be allowed to travel toward the muffler. Hereinafter, a description will be given of a control flow of the method for preventing the failure of an exhaust recovery device according to an exemplary embodiment of the present invention.

Referring to FIG. 1, first, a temperature of the cooling water may be measured using a sensor to determine whether the temperature of cooling water is less than a warm-up reference temperature (e.g., about 90° C.) (S10). When the temperature of the cooling water is determined to be less than the warm-up reference temperature, the controller may be configured to determine that the engine is cold, and a sole exhaust heat recovery mode may be operated to introduce all the exhaust gas passing through the DPF into the exhaust heat recovery device 1 (S20). In addition, when the temperature of the cooling water is measured to be the warm-up reference temperature or greater, the controller may be configured to determine that the engine is in a warm state, and a normal mode may be operated, in which the exhaust gas passing through the DPF may travel through both the exhaust heat recovery device 1 and the passage 5 circumventing the exhaust heat recovery device 1 (S30).

Then, after step S20, the temperature of the exhaust gas in the rear of the DPF may be compared by the controller to a breakdown reference temperature (e.g., about 850° C.) (S40). When the temperature of the exhaust gas in the rear of the DPF is the equal to or greater than the breakdown reference temperature, the sole exhaust heat recovery mode may be deactivated and the normal mode may be activated (S50). In addition, when the temperature of the exhaust gas in the rear of the DPF is determined to be less than the breakdown reference temperature in step S40, the controller may be configured to determine whether the amount of soot in the DPF has reached a regeneration reference value (S60).

When the amount of soot has been determined to reach the regeneration reference value, the opening degree of the APS may be compared to an open reference (e.g., about 70%) (S70). When the open degree of the APS is greater than the open reference value, the sole exhaust heat recovery mode may be deactivated and the normal mode starts (S50). Further, when the amount of soot is determined not to have reached the regeneration reference value of the DPF (e.g., remains less than the regeneration reference value), the method may proceed to step S10, in which the temperature of the cooling water may be compared by the controller to the warm-up reference temperature. Further, even when the amount of soot reaches the regeneration reference value of the DPF, the method may proceed to step S10 when the opening degree of APS is less than the open reference value. In step S10, as described above, the temperature of the cooling water may be compared to the warm-up reference temperature to select the sole exhaust heat recovery mode or the normal mode.

According to the present disclosure, as described above, either when the temperature of exhaust gas at the rear of DPF increases to a degree that may cause breakdown of the exhaust hear recovery device 1 or when the back pressure of the DPF increases to a degree that may cause the breakdown of the engine during a sole exhaust het recovery mode, the hot exhaust gas may be controlled such that a portion thereof bypasses, rather than passing entirely through, the exhaust heat recovery device 1, thereby preventing the breakdown of the exhaust heat recovery device 1 and the failure of the engine.

Although the present invention was described with reference to specific exemplary embodiments shown in the drawings, it is apparent to those skilled in the art that the present invention may be changed and modified in various ways without departing from the scope of the present invention, which is described in the following claims.

What is claimed is:

1. A method for preventing a failure of an exhaust heat recovery device, comprising:
    operating, by a controller, a sole exhaust heat recovery mode to introduce all exhaust gas flowing from a diesel particulate filter (DPF) into the exhaust heat recovery device where the exhaust gas exchanges heat with the cooling water in response to determining that cooling water has a temperature that is less than a warm-up reference temperature;
    opening, by the controller, a passage through which the exhaust gas bypasses the exhaust heat recovery device in response to determining that the exhaust gas at a rear of the DPF has a temperature that is greater than the warm-up reference temperature during the sole exhaust heat recovery mode;
    determining, by the controller, regeneration of the DPF based on a back pressure of the DPF when the temperature of the exhaust gas at the rear of the DPF is less than a breakdown reference temperature during the sole exhaust heat recovery mode; and
    deactivating, by the controller, the sole exhaust heat recovery mode, when the DPF is determined to undergo regeneration and an opening degree of an accelerator position sensor (APS) is greater than an open reference value.

2. The method of claim 1, wherein when cooling water has a temperature that is greater than the warm-up reference temperature, prior to the exhaust heat recovery, a normal mode is activated in which the exhaust gas flowing from the DPF is driven toward both the exhaust heat recovery device and the passage for bypassing the exhaust heat recovery device.

3. The method of claim 1, wherein after the regeneration determination, either when the condition of the DPF does not meet a regeneration reference value or when the opening degree of APS is less than the open reference value, a temperature of cooling water is compared to an engine warm-up reference temperature.

4. The method of claim 1, wherein the deactivation is executed by activating a normal mode, in which the exhaust gas released from the DPF is driven toward both the exhaust heat recovery device and the passage for bypassing the exhaust heat recovery device.

5. The method of claim 1, wherein in the sole exhaust heat recovery mode, an exhaust flap is operated by the controller to open a passage along which the exhaust gas travels from the DPF to a muffler via the exhaust heat recovery device and to close a passage along which the exhaust gas travels from the DPF to the muffler while circumventing the exhaust heat recovery device, and wherein in the normal mode, the exhaust flap is operated to block a passage along which the exhaust gas travels from the DPF to the muffler via the exhaust heat recovery device and to open a passage along which the exhaust gas travels from the DPF to the muffler while circumventing the exhaust heat recovery device.

6. A system for preventing a failure of an exhaust heat recovery device, comprising:
    a memory configured to store program instructions; and
    a processor configured to execute the program instructions, the program instructions when executed configured to:
        operate a sole exhaust heat recovery mode to introduce all exhaust gas flowing from a diesel particulate filter (DPF) into the exhaust heat recovery device where the exhaust gas exchanges heat with the cooling water in response to determining that cooling water has a temperature that is less than a warm-up reference temperature;
        open a passage through which the exhaust gas bypasses the exhaust heat recovery device in response to determining that the exhaust gas at a rear of the DPF has a temperature that is greater than the warm-up reference temperature during the sole exhaust heat recovery mode;
        determine regeneration of the DPF based on a back pressure of the DPF when the temperature of the exhaust gas at the rear of the DPF is less than a breakdown reference temperature during the sole exhaust heat recovery mode; and
        deactivate the sole exhaust heat recovery mode, when the DPF is determined to undergo regeneration and an opening degree of an accelerator position sensor (APS) is greater than an open reference value.

7. The system of claim 6, wherein when cooling water has a temperature that is greater than the warm-up reference temperature, prior to the exhaust heat recovery, the program instructions when executed are further configured to activate a normal mode in which the exhaust gas flowing from the DPF is driven toward both the exhaust heat recovery device and the passage for bypassing the exhaust heat recovery device.

8. The system of claim 6, wherein after the regeneration determination, either when the condition of the DPF does not meet a regeneration reference value or when the opening degree of APS is less than the open reference value, a temperature of cooling water is compared to an engine warm-up reference temperature.

9. The system of claim 6, wherein for the deactivation, the program instructions when executed are further configured to activate a normal mode, in which the exhaust gas released from the DPF is driven toward both the exhaust heat recovery device and the passage for bypassing the exhaust heat recovery device.

10. The system of claim 6, wherein the program instructions when executed are further configured to:
    operate an exhaust flap in the sole exhaust heat recovery mode, to open a passage along which the exhaust gas travels from the DPF to a muffler via the exhaust heat recovery device and to close a passage along which the exhaust gas travels from the DPF to the muffler while circumventing the exhaust heat recovery device; and
    operate the exhaust flap in the normal mode, to block a passage along which the exhaust gas travels from the DPF to the muffler via the exhaust heat recovery device and to open a passage along which the exhaust gas travels from the DPF to the muffler while circumventing the exhaust heat recovery device.

* * * * *